A. ATWOOD.
Car Wheels.

No. 140,339. Patented July 1, 1873.

WITNESSES:

INVENTOR:
Anson Atwood

UNITED STATES PATENT OFFICE.

ANSON ATWOOD, OF BROOKLYN, NEW YORK, ASSIGNOR OF ONE-HALF HIS RIGHT TO ISRAEL D. CONDIT, OF MILLBURN, NEW JERSEY.

IMPROVEMENT IN CAR-WHEELS.

Specification forming part of Letters Patent No. 140,339, dated July 1, 1873; application filed June 10, 1872.

*To all whom it may concern:*

Be it known that I, ANSON ATWOOD, of Brooklyn, New York, have invented an Improved Elastic Railway Wheel, of which the following is a full description, reference being had to the accompanying drawings, in which—

Figure 1:
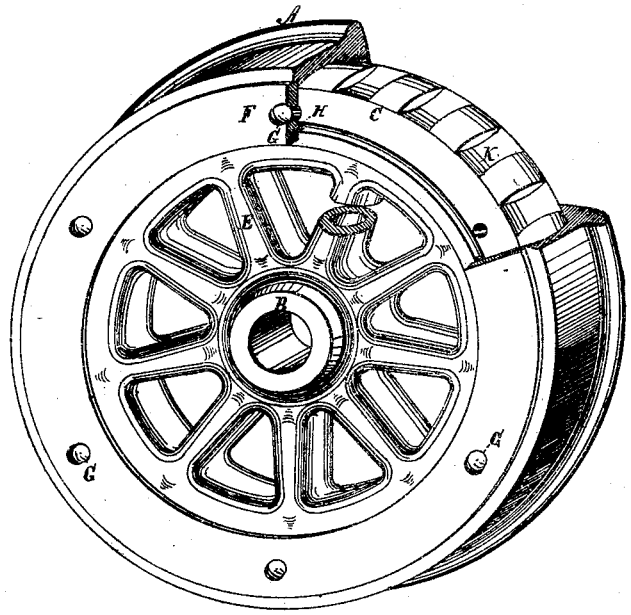
Figure 2:
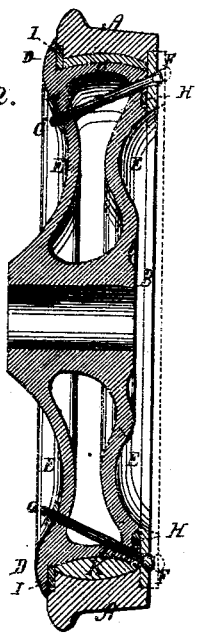

Figure 1 represents a perspective view of a car-wheel made with hollow spokes with a portion of the outer rim of the tire removed, showing the concavity of the tire and the concave and convex surface on the rim of the inner part or portion of the wheel, embodying my improvement. Fig. 2 represents a cross section of a plate-wheel exhibiting its several parts embodying my improvement.

The object of my invention is to produce an elastic railway wheel which shall be simple in construction as well as strong and durable.

The nature of my invention consists in a mode of constructing a railway wheel in two principal parts, one of which is composed of the hub, the spokes or plates, and the rim, which, together, form the central portion or body of the wheel. The second part is a tire, which constitutes the outer part or tread of the wheel. This part is made concave at its inner surface, and a small space is left between the two parts, forming an annular chamber, which is packed with rubber, oakum, or other elastic fibrous materials, forming an elastic cushion upon which the whole weight upon the wheel will rest; and this packing of oakum or other elastic fibrous material secures the tire to the wheel without the necessity of using bolts or other fastenings.

The accompanying drawings represent a mode in which I have embodied the invention.

In the drawings, A denotes the tire or tread of the wheel. B denotes the hub. C denotes the rim. D denotes the flange. E E denote the plates or spokes. F denotes the ring or flange for covering the edge of the packing. G denotes the bolts. H denotes a groove for rubber packing between the side of the wheel and the ring F. I denotes the rubber packing between wheel and tire. K denotes the oakum packing.

In this case I make use of both India-rubber and a fibrous material for the packing between the tire and the body of the wheel, arranging the two kinds in alternate sections. Each kind of packing is contained in a hollow space between the interior of the tire and the periphery of the body. The hollow space for the rubber packing I is convex at its inner side and concave at its outer side, its walls being thus parallel, or thereabout, so that a slab of rubber may be inserted in the space. The hollow space for the fibrous packing K is concave at both sides, the body of the wheel having a peripheral cavity in its solid substance at the inner side of the space, and the tire having a similar cavity at its inner side opposite the cavity of the body to form the outer side of the space.

This packing of the hollow spaces is done as follows, viz: The tire is first placed upon the body or central portion of the wheel, and by pressing the central portion of the wheel to one side the slabs of rubber are easily inserted between the tire and wheel upon the opposite side, and by a strong hydraulic or other pressure the body of the wheel is moved one way and the other until all the rubber slabs are inserted. The intervening concave spaces or sections between the rubber are then filled with oakum or other elastic fibrous material, securely packed in, progressively, by means of a calking-chisel and a mallet. The outer edge of this packing is covered by the ring or flange marked F, which is secured by bolts marked G. This ring may be set in a groove or on the outside of the tire, as shown by the dotted lines marked F, Fig. 2.

This packing is used for the purpose of preventing the metal connection between the tire and the inner part of the wheel, and also to prevent, as much as possible, the rapid injury of the rails and the constant jar which so rapidly crystallizes the axles, &c.

The advantage of this method of packing may be stated as follows: First, the rubber becomes compact by the heavy pressure used in inserting it between the tire and wheel, being confined from spreading by the oakum or other fibrous material packed in the concave spaces, and thereby holding the rubber slabs permanently in their places. This combination of packing of rubber and oakum or other fibrous material furnishes sufficient elasticity, and supports the required weight upon the wheel. Second, the fibrous material can be inserted piece-meal, and consolidated by packing into a space which is larger within than at its orifice, as seen at K; hence, when thus inserted, it prevents the lateral movement of the tire and body.

I do not confine my mode of packing to the placing of it between a concave and convex surface on the tire and wheel, because it may be inserted between cone-shaped, angular, or other shaped surfaces as well.

Having thus fully described my invention, what I claim as new, and desire to secure by Letters Patent of the United States, is as follows:

1. The body of a car-wheel, its rim having alternate convex and concave sections in combination with the tire having a concave inner surface.

2. The wheel when packed with rubber and oakum or other fibrous material in the alternate cavities between the tire and the body of the wheel, as herein described, and for the purposes herein set forth.

3. The combination of the tire A having a concave inner surface with the rim C having concave cavities and convex projections, by means of the packing, substantially as described, and for the purpose set forth.

ANSON ATWOOD.

Attest:
P. E. DYE,
N. H. THOMAS.